(12) United States Patent
Lo et al.

(10) Patent No.: US 11,238,267 B1
(45) Date of Patent: **\*Feb. 1, 2022**

(54) DISTORTED FINGERPRINT MATCHING USING POSE AND MINUTIA GROUPING

(71) Applicant: IDEMIA IDENTITY & SECURITY USA LLC, Billerica, MA (US)

(72) Inventors: Peter Zhen-Ping Lo, Mission Viejo, CA (US); Hui Chen, Foothill Ranch, CA (US)

(73) Assignee: IDEMIA IDENTITY & SECURITY USA LLC, Billerica, MA (US)

( * ) Notice: Subject to any disclaimer, the term of this patent is extended or adjusted under 35 U.S.C. 154(b) by 158 days.

This patent is subject to a terminal disclaimer.

(21) Appl. No.: 16/773,893

(22) Filed: Jan. 27, 2020

Related U.S. Application Data

(63) Continuation of application No. 15/859,540, filed on Dec. 31, 2017, now Pat. No. 10,546,179.

(51) Int. Cl.
*G06K 9/00* (2006.01)

(52) U.S. Cl.
CPC ..... *G06K 9/00093* (2013.01); *G06K 9/00073* (2013.01)

(58) Field of Classification Search
CPC .............. G06K 9/00093; G06K 9/00073
See application file for complete search history.

(56) References Cited

U.S. PATENT DOCUMENTS

| 5,572,597 | A  | * | 11/1996 | Chang  | G06K 9/0008 382/125 |
| 8,995,729 | B2 | * | 3/2015  | Marques | G06K 9/6807 382/124 |
| 9,690,972 | B1 | * | 6/2017  | Chau   | G06K 9/2081 |
| 9,690,982 | B2 |   | 6/2017  | Chau   |  |

OTHER PUBLICATIONS

Germain, Robert S., Andrea Califano, and Scott Colville. "Fingerprint matching using transformation parameter clustering." IEEE Computational Science and Engineering 4.4 (1997): 42-49.*

(Continued)

*Primary Examiner* — Shefali D Goradia
(74) *Attorney, Agent, or Firm* — Yasser Mourtada

(57) ABSTRACT

A list of possible mated minutiae in a reference fingerprint and a search fingerprint is identified. The list of possible mated minutiae is divided into different groups of mated minutiae using pose grouping based on rigid transformation parameters. For each group, the possible mated minutiae are filtered to get a set of consistent mated minutiae pairs having similar rigid transformation. The topological consistency between groups is determined. If any two groups are topologically consistent to each other, they are merged to form a (virtual) larger group. A non-linear transformation parameters are estimated from the mated minutiae in the merged group. The overall similarity of mated and non-mated minutiae in the overlapping area is determined after non-linear alignment of the two fingerprints, and the maximum similarity is output as the final similarity score between two fingerprints.

20 Claims, 12 Drawing Sheets

(56) References Cited

OTHER PUBLICATIONS

D. Ahn, S. G. Kong, Y. Chung and K. Y. Moon, "Matching with Secure Fingerprint Templates Using Non-invertible Transform," 2008 Congress on Image and Signal Processing, 2008, pp. 29-33, doi: 10.1109/CISP.2008.742.*

X. Gong, Z. Sun, Q. Liu and L. Sun, "Accuracy improvement with merged template in fingerprint identifying," 2010 3rd International Congress on Image and Signal Processing, 2010, pp. 1783-1786, doi: 10.1109/CISP.2010.5647983.*

Arora et al. "Latent fingerprint matching: performance gain via feedback from exemplar prints," IEEE Transactions on Pattern Analysis and Machine Intelligence, 36(12): 2452-65, Dec. 2014.

Cappelli et al. "Fingerprint classification by directional Image Partitioning", IEEE Trans. PAMI, vol. 21 No. 5, pp. 402-421, May 1999.

Feng et al. "Orientation field estimation for latent fingerprint enhancement," IEEE Transactions on Pattern Analysis and Machine Intelligence, 35(4): 925-40, Apr. 2013.

Karn et al. "Fingerprint classification" Pattern Recognition, vol. 29, No. 3 pp. 389-404, year 1996.

Liu et al. "Fingerprint registration by maximization of mutual information", IEEE Transactions on Image Processing, vol. 15, No. 5, pp. 1100-1110, 2006.

Nilsson et al. "Locaization of Corresponding points in Fingerprints by complex filtering", Pattern Recognition Letters, vol. 24, No. 13, pp. 2135-2144, 2003.

Park et al. "Singular point detection by shape analysis of directional fields in fingerprints", Pattern Recognition, vol. 39, No. 5, pp. 839-855, 2006.

Wang et al. "Enhanced gradient-based algorithm for the estimation of fingerprint orientation fields", Applied Mathematics and Computation, vol. 185, pp. 823-833, year 2007.

Yager et al. "Coarse Fingerprint Registration Using Orientation Fields," EURASIP Journal on Applied Signal Processing, 2005:13, 2043-2053.

Zhou et al. "A model-based method for the computation of fingerprints orientation field", IEEE Tranac. Image Process, vol. 13, pp. 821-835, year 2004.

* cited by examiner

DISTORTED
FINGERPRINT MATCHING

DISTORTED FINGERPRINT MATCHING

DISTORTED FINGERPRINT MATCHING USING POSE AND MINUTIA GROUPING

CROSS REFERENCE TO RELATED APPLICATION

This application is a continuation of and claims priority to U.S. application Ser. No. 15/859,540, filed on Dec. 31, 2017 and issued as U.S. Pat. No. 10,546,179.

FIELD

This disclosure generally relates to fingerprint identification systems.

BACKGROUND

Pattern matching systems such as ten-print or fingerprint matching systems play an important role in criminal and civil applications. For example, fingerprint identification is often used to identify and track suspects and in criminal investigations. Similarly, fingerprint verification is used in in civil applications to prevent fraud and support other security processes.

SUMMARY

In general, the matching of distorted fingerprints pose several challenges to fingerprint identification and matching technologies. For instance, distortions can impact matching accuracy because the distortions may change both the geometric locations and orientations of minutiae.

Aspects of this disclosure address the above-noted deficiencies and provide improved matching to the distorted fingerprints. According to some implementations, a list of possible mated minutiae in a reference fingerprint and a search fingerprint is identified. The list of possible mated minutiae is divided into different groups of mated minutiae using pose grouping based on rigid transformation parameters. For each group, the possible mated minutiae are filtered to get a set of consistent mated minutiae pairs having similar rigid transformation. The topological consistency between groups is determined. If any two groups are topologically consistent to each other, they are merged to form a (virtual) larger group. Non-linear transformation parameters are estimated from the mated minutiae in the merged group. The overall similarity of mated and non-mated minutiae in the overlapping area is determined after non-linear alignment of the two fingerprints, and the maximum similarity is output as the final similarity score between two fingerprints.

Aspects of the implementations disclosed in this specification include systems and methods for matching distorted fingerprints. The method, executed at least in part by one or more processors, includes selecting (i) one or more search minutiae of a search fingerprint, and (ii) one or more reference minutiae of a reference fingerprint. For each search minutia included in the one or more search minutiae, a corresponding reference minutia from the one or more reference minutiae is identified. The corresponding reference minutia has a similarity to the search minutia that satisfies a similarity threshold. The method further includes determining one or more groups of the one or more search minutiae in the search fingerprint and the one or more reference minutiae in the reference fingerprint that match the each other, determining one or more matches between the groups based on a topological consistency between two groups, for each matched pair of groups, merging, by the one or more processors, minutiae in the pair of groups, and performing a non-linear transformation on the one or more search minutiae of the search fingerprint.

Implementations may each optionally include one or more of the following features. For instance, in some implementations, the method further includes in response to performing the non-linear transformation, determining similarity levels associated with the selected one or more search minutiae and the selected one or more reference minutiae. The similarity levels include similarities of matched and non-matched minutiae in an overlapping area of the selected one or more search minutiae and the selected one or more reference minutiae. The method further includes determining, as a similarity between the search fingerprint and the reference fingerprint, the best similarity level among all groups having topologically consistent group pairs.

In some implementations, performing a non-linear transformation includes determining parameters for a Thin-Plate Spline (TPS) model and applying the determined parameters to the one or more search minutiae of the search fingerprint to perform the non-linear transformation.

In some implementations, the method further includes determining whether a group is a merged group or a non-merged group, and performing rigid transformation on the minutiae included in the group in response to determining that the group is a non-merged group.

In some implementations, the method further includes determining that the group is a merged group. Performing the non-linear transformation includes performing non-linear transformation on the one or more search minutiae of the search fingerprint in response to determining that the group is a merged group.

In some implementations, each group includes two or more mated minutiae pairs having rigid transformation parameters that satisfy a threshold level of similarity.

In some implementations, the one or more groups of the one or more search minutiae in the search fingerprint and the one or more reference minutiae in the reference fingerprint are determined based on values of the rigid transformation parameters.

Other aspects include corresponding methods, systems, apparatus, computer-readable storage media, and computer programs configured to implement the above-noted embodiments.

The above-noted aspects and implementations further described in this specification may offer several advantages. For example, advantages of the implementations disclosed in this specification include one or more of: (a) improved accuracy in fingerprint matching systems; (b) reduction of false positive and false negative rates; and (c) increased speed of fingerprint matching.

The details of one or more implementations are set forth in the accompanying drawings and the description below. Other features and advantages will become apparent from the description, the drawings, and the claims.

BRIEF DESCRIPTION OF THE DRAWINGS

In the drawings, like reference numbers represent corresponding parts throughout.

DETAILED DESCRIPTION

Advancements have been made in fingerprint identification systems. However, matching distorted fingerprints is still a challenge. In some cases, nonlinear distortions of fingerprint may be unavoidable when capturing the images of a live finger with a two-dimensional (2-D) contact sensor because of the elasticity of the skin, contact pressure, finger displacement, skin moisture content, and/or sensor noise. In many instances, fingerprints are obtained from latent images and include only partial prints having reduced, blurred, noisy, or distorted fingerprint regions. Improvements in fingerprint identification systems for matching distorted fingerprints are needed to reduce false positive and false negative results of fingerprint matching.

Implementations of methods and systems for matching distorted fingerprints are described with reference to FIGS. 1A-10.

Figure 1A:
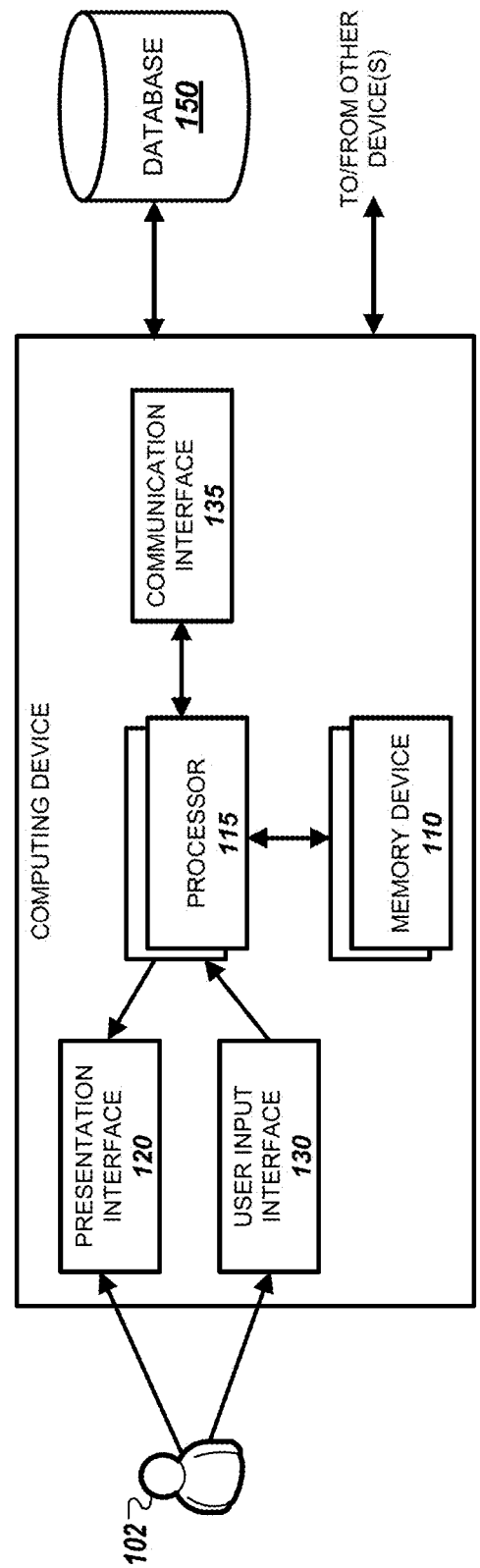
FIG. 1A depicts a block diagram of an exemplary computing device in an automatic fingerprint identification system.

FIG. 1A is a block diagram of an exemplary automatic fingerprint identification system (AFIS) 100. Briefly, the automatic fingerprint identification system 100 may include a computing device including a memory device 110, a processor 115, a presentation interface 120, a user input interface 130, and a communication interface 135. The automatic fingerprint identification system 100 may be configured to facilitate and implement the methods described is this specification. In addition, the automatic fingerprint identification system 100 may incorporate any suitable computer architecture that enables operations of the system described throughout this specification.

The processor 115 may be operatively coupled to memory device 110 for executing instructions to implement the methods described is this specification. In some implementations, executable instructions are stored in the memory device 110. For instance, the automatic fingerprint identification system 100 may be configurable to perform one or more operations described by programming the processor 115. For example, the processor 115 may be programmed by encoding an operation as one or more executable instructions and providing the executable instructions in the memory device 110. The processor 115 may include one or more processing units, e.g., without limitation, in a multi-core configuration.

The processor 115 may include one or more processing units, e.g., in a multi-core configuration. The term processing unit, as used herein, refers to microprocessors, microcontrollers, reduced instruction set circuits (RISC), application specific integrated circuits (ASIC), logic circuits, and any other circuit or device capable of executing instructions to perform functions described herein.

The memory device 110 may be one or more devices that enable storage and retrieval of information such as executable instructions and/or other data. The memory device 110 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

The memory device 110 may be configured to store a variety of data including, for example, matching algorithms, scoring algorithms, scoring thresholds, perturbation algorithms, fusion algorithms, virtual minutiae generation algorithms, minutiae overlap analysis algorithms, and/or virtual minutiae analysis algorithms. In addition, the memory device 110 may be configured to store any suitable data to facilitate the methods described throughout this specification.

The presentation interface 120 may be coupled to processor 115. For instance, the presentation interface 120 may present information, such as a user interface showing data related to fingerprint matching, to a user 102. For example, the presentation interface 120 may include a display adapter (not shown) that may be coupled to a display device (not shown), such as a cathode ray tube (CRT), a liquid crystal display (LCD), an organic LED (OLEO) display, and/or a hand-held device with a display. In some implementations, the presentation interface 120 includes one or more display devices. In addition, or alternatively, the presentation interface 120 may include an audio output device (not shown), e.g., an audio adapter and/or a speaker.

The user input interface 130 may be coupled to the processor 115 and receives input from the user 102. The user input interface 130 may include, for example, a keyboard, a pointing device, a mouse, a stylus, and/or a touch sensitive panel, e.g., a touch pad or a touch screen. A single component, such as a touch screen, may function as both a display device of the presentation interface 120 and the user input interface 130.

In some implementations, the user input interface 130 may represent a fingerprint scanning device that is used to capture and record fingerprints associated with a subject (e.g., a human individual) from a physical scan of a finger, or alternately, from a scan of a latent print. In addition, the user input interface 130 may be used to create a plurality of reference records.

A communication interface 135 may be coupled to the processor 115 and configured to be coupled in communication with one or more other devices such as, for example, another computing system (not shown), scanners, cameras, and other devices that may be used to provide biometric information such as fingerprints to the automatic fingerprint identification system 100. Such biometric systems and devices may be used to scan previously captured fingerprints or other image data or to capture live fingerprints from subjects. The communication interface 135 may include, for example, a wired network adapter, a wireless network adapter, a mobile telecommunications adapter, a serial communication adapter, and/or a parallel communication adapter. The communication interface 135 may receive data from and/or transmit data to one or more remote devices. The communication interface 135 may be also be web-enabled for remote communications, for example, with a remote desktop computer (not shown).

The presentation interface 120 and/or the communication interface 135 may both be capable of providing information suitable for use with the methods described throughout this specification, e.g., to the user 102 or to another device. In this regard, the presentation interface 120 and the communication interface 135 may be used to as output devices. In other instances, the user input interface 130 and the communication interface 135 may be capable of receiving information suitable for use with the methods described throughout this specification, and may be used as input devices.

The processor 115 and/or the memory device 110 may also be operatively coupled to one or more databases 150. The one or more databases 150 may be any computer-operated hardware suitable for storing and/or retrieving data, such as, for example, pre-processed fingerprints, processed fingerprints, normalized fingerprints, extracted features, extracted and processed feature vectors such as octant feature vectors (OFVs), threshold values, virtual minutiae lists, minutiae lists, matching algorithms, scoring algorithms, scoring thresholds, perturbation algorithms, fusion algorithms, virtual minutiae generation algorithms, minutiae overlap analysis algorithms, and virtual minutiae analysis algorithms.

In some implementations, the database 150 may be integrated into the automatic fingerprint identification system 100. The automatic fingerprint identification system 100 may include one or more hard disk drives that represent the database 150. For example, the database 150 may include multiple storage units such as hard disks and/or solid state disks in a redundant array of inexpensive disks (RAID) configuration. In some implementations, the database 150 may include a storage area network (SAN), a network attached storage (NAS) system, and/or cloud-based storage. In some implementations, the database 150 may be external to the automatic fingerprint identification system 100 and may be accessed by a storage interface (not shown). For instance, the database 150 may be used to store various versions of reference records including associated minutiae, octant feature vectors (OFVs) and associated data related to reference records.

The computing device may include or be connected to access points, storage systems, cloud systems, modules, one or more databases including one or more media databases, and servers including one or more network servers such as a computing device. In some implementations, the one or more network servers may include any suitable electronic device coupled to the one or more networks, including but not limited to a personal computer, a server computer, a series of server computers, a mini computer, and a mainframe computer, or combinations thereof. The one or more network servers may also include an application server, a web server, or a series of servers, running a network operating system, examples of which may include but are not limited to Microsoft® Windows® Server, Novell® NetWare®, or Linux$_@$. The one or more network servers may be used for and/or provide cloud and/or network computing and media provision services. Although not shown in the figures, the server may have connections to external systems providing messaging functionality such as e-mail, SMS messaging, text messaging, and other functionalities, such as advertising services, search services, etc. In some implementations, the one or more networks may include a cloud system that may provide Internet connectivity and other network-related functions. For example, the cloud system may provide storage services for at least a portion of the data transmitted between components of the system.

Communicatively coupled components may be in communication through being integrated on the same printed circuit board (PCB), in communication through a bus, through shared memory, through a wired or wireless data communication network, and/or other means of data communication. Data communication networks referred to herein may be implemented using Transport Control Protocol/Internet Protocol (TCP/IP), User Datagram Protocol (UDP), or the like, and the underlying connections may comprise wired connections and corresponding protocols, for example, Institute of Electrical and Electronics Engineers (IEEE) 802.3 and/or wireless connections and associated protocols, for example, an IEEE 802.11 protocol, an IEEE 802.15 protocol, and/or an IEEE 802.16 protocol.

Feature Extraction

In general, feature extraction describes the process by which the automatic fingerprint detection system 100 extracts a list of minutiae from each of reference fingerprint, and the search fingerprint. A "minutiae" represents features of a fingerprint and may be used in comparisons of a reference fingerprint to a search fingerprint to determine a fingerprint match. For example, common types of minutiae may include, for example, a ridge ending, a ridge bifurcation, a short ridge, an island, a ridge enclosure, a spur, a crossover or bridge, a delta, or a core.

Figure 1B:
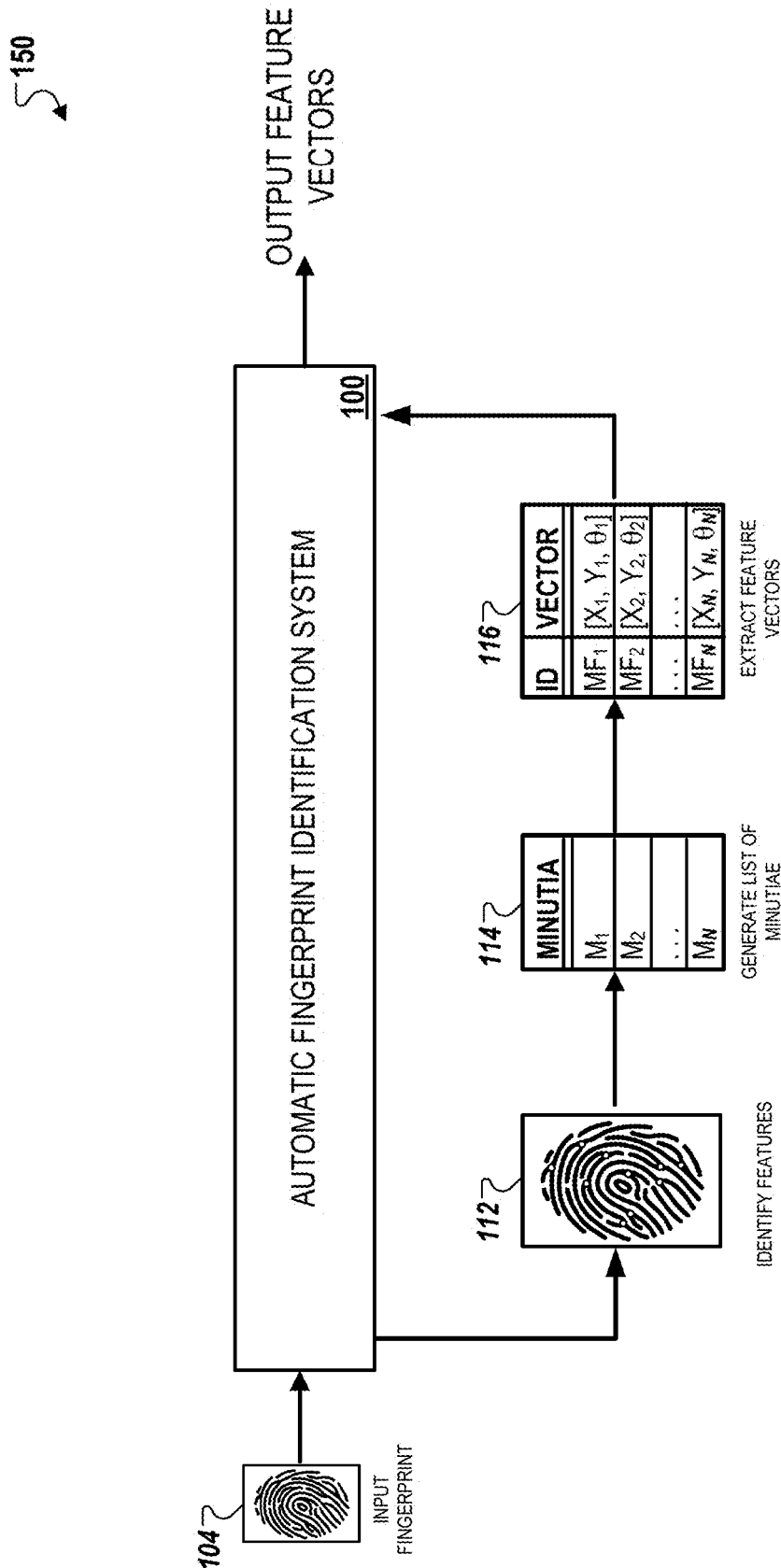
FIG. 1B depicts a block diagram of an exemplary feature extraction process in an automatic fingerprint identification system.

FIG. 1B is a block diagram of an exemplary feature extraction process 150. As shown, after receiving an input fingerprint 104, the automatic fingerprint detection system 100 initially identifies a set of features 112 within the fingerprint, generates a list of minutiae 114, and extracts a set of feature vectors 116. For instance, the automatic fingerprint detection system 100 may generate a list of minutia 114 for each of the reference fingerprint (or "reference record") and a search fingerprint (or "search record").

In some implementations, the feature vectors 116 may be described using feature vector that is represented by $Mf_i=(x_i,y_i,\theta_i)$. The feature vector Mf includes a minutia location that is defined by coordinate geometry such as $(x_i,y_i)$, and a minutiae direction that is defined by the angle $\theta_i \in [0,2\pi]$. In some implementations, further minutiae characteristics such as, quality, ridge frequency, and ridge curvature may also be used to describe feature vector $Mf_i$. The extracted feature vectors may be used to generate octant feature vectors (OFVs) for each of identified minutia within the search and reference fingerprints.

Octant Feature Vector (OFV) Overview

The automatic fingerprint identification system 100 may compare the search and reference records by generating and comparing feature vectors associated with minutiae that are extracted from the search and reference records, respectively. For instance, as described in more detail with reference to FIG. 5 below, octant feature vectors (OFVs) may be used to define attributes of the extracted minutiae. In some implementations, other minutiae descriptors may be used.

OFVs encode geometric relationships between particular minutiae and the nearest neighboring minutiae to the particular minutiae in a particular sector (referred to as the "octant neighborhood") of an octant. Each sector of the octant used in an OFV spans 45 degrees of a fingerprint region. The nearest neighboring minutiae may be assigned to one sector of the octant based on their orientation difference.

The geometric relationship between a particular minutia and its nearest minutia in each octant sector may be described by relative features including, for example, distance between the minutiae and the orientation difference between minutiae. The representation achieved by the use of an OFV is invariant to rigid transformation.

OFV Generation

The automatic fingerprint identification system 100 may generate an octant feature vector (OFV) for each minutia of the features extracted. Specifically, the automatic fingerprint identification system 100 may generate OFVs encoding the distance and the orientation difference between the particular minutiae and the nearest neighbor in each of eight octant sectors. In some implementations, the automatic fingerprint identification system 100 may generate feature vectors with different numbers of sectors.

Figure 2:
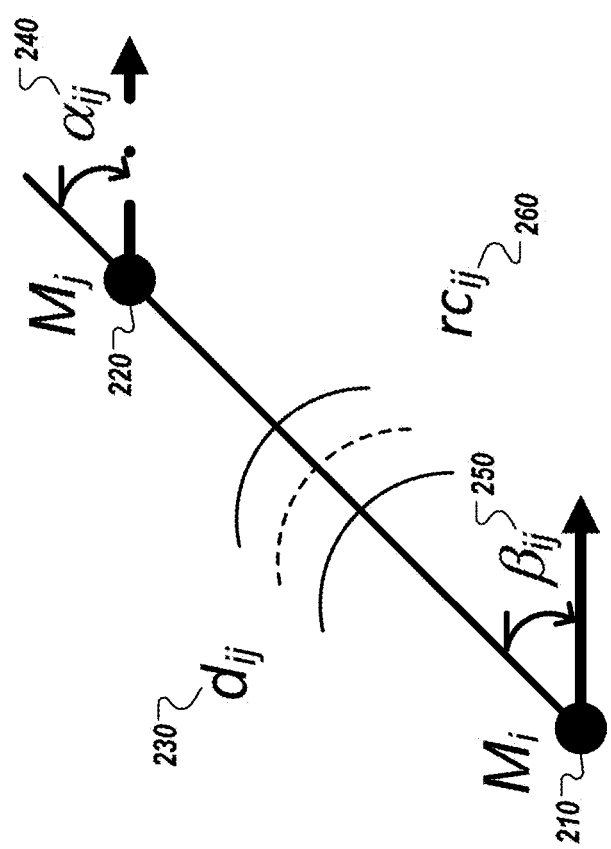
FIG. 2 is an exemplary illustration of geometric relationships between a particular minutia and a neighboring minutia.

FIG. 2 is an exemplary illustration of geometric relationships between a particular minutia 210 and a neighboring minutia 220. The geometric relationships may be used to construct a rotation and translation invariant feature vector that includes relative attributes $(d_{ij}, \alpha_{ij}, \beta_{ij})$ between the particular minutia 210 and the neighboring minutia 220.

As depicted in FIG. 2, the automatic fingerprint identification system 100 may compute a Euclidean distance 230 between the particular minutia 210 and the neighboring minutia 220, a minimum rotation angle 240 for the neighboring minutia, and a minimum rotation angle 250 for the particular minutia 210. In addition, the automatic fingerprint identification system may compute a ridge count 260 across the particular minutia 210 and the neighboring minutia 220.

Specifically, the rotation and translation invariant feature vector may be represented as vector 1 (represented below). In some implementations, an OFV is created to describe the geometric relationship between. Further, $M_i$ represents the particular minutia and $M_j$ represents the nearest neighbor minutiae in one of the octant sectors. The OFV for each sector may be described in the given vector from vector 1:

Vector 1: $(d_{ij}, \alpha_{ij}, \beta_{ij})$, where $d_{ij}$ denotes the Euclidean distance 230, where $\alpha_{ij} = \lambda(\theta_i, \theta_j)$ denotes the minimum rotation angle 240 required to rotate a line of direction $\theta_i$ in a particular direction to make the line parallel with a line of direction $\theta_j$, and where $\beta_{ij} = \lambda(\theta_i, \angle(M_i, M_j))$ denotes the minimum rotation angle 250, where $\angle(M_i, M_j)$ denotes the direction from the particular minutia 210 to the neighboring minutia 220, and where $\lambda(a,b)$ denotes the same meaning as defined in $\alpha_{ij}$ Because each element calculated in the feature vector is a relative measurement between the particular minutia 210 and the neighboring minutia 220, the feature vector is independent from the rotation and translation of the fingerprint. Elements 230, 240, and 250 may be referred to as relative features and are used to compute the similarity between pair of particular minutia 210 and the neighboring minutia 220. In some implementations, other minutiae features such as absolute features may additionally or alternatively be used by the automatic fingerprint identification system 100 to weigh the computed similarity score between a pair of mated minutiae that includes particular minutia 210 and the neighboring minutia 220.

Figure 3:
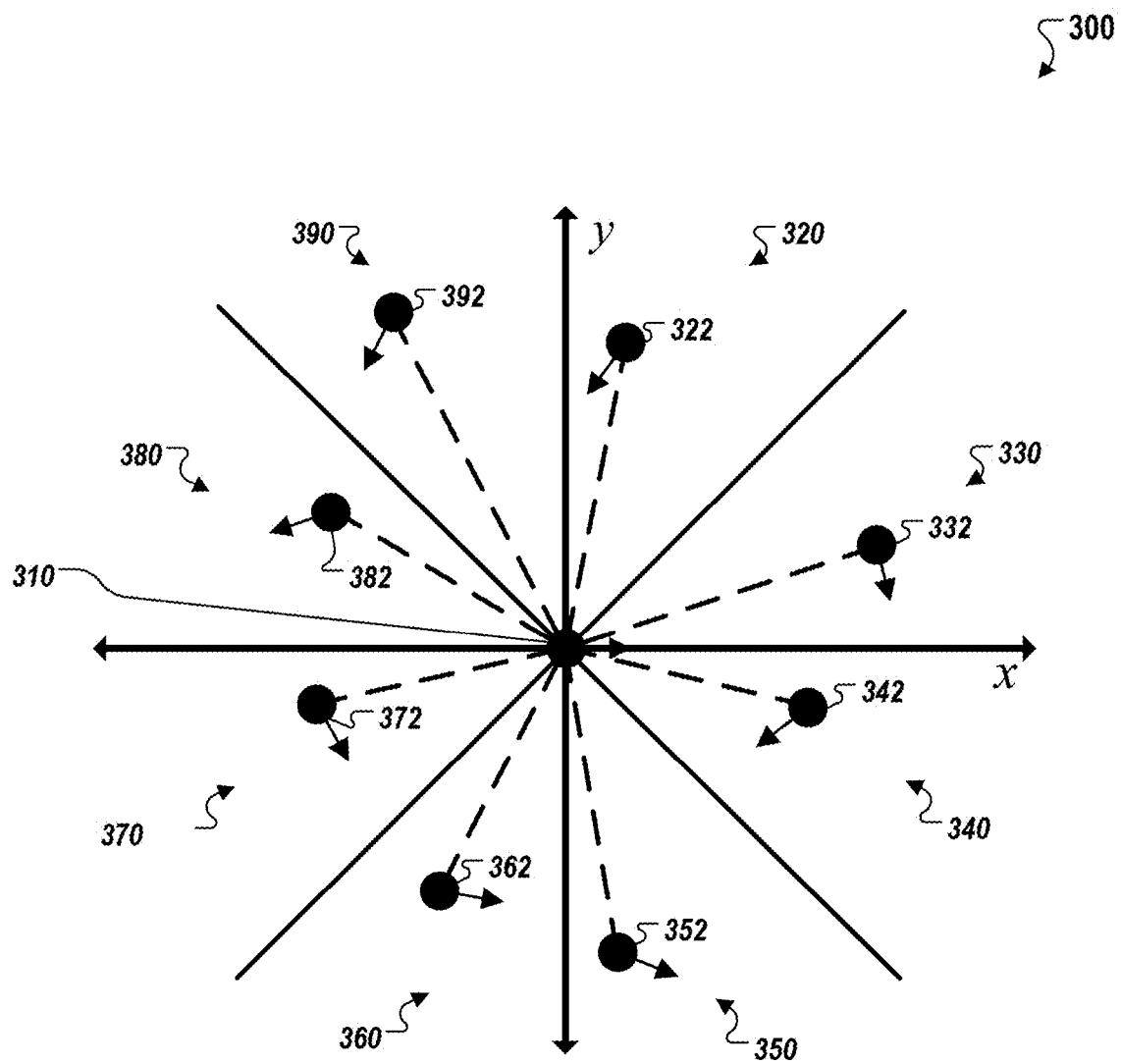
FIG. 3 is a graphical illustration of the relationships represented in an exemplary octant feature vector (OFV).

FIG. 3 is a graphical illustration of the relationships represented in an exemplary octant feature vector (OFV) 300. The OFV 300 may be generated for a particular minutia 310, which corresponds to the particular minutia 210 shown in FIG. 2. The OFV 300 represents relationships between the particular minutiae 310 and its nearest neighboring minutiae 322, 332, 342, 352, 362, 372, 382, and 392 in sectors 320, 330, 340, 350, 360, 370, 380, and 390, respectively. However, the graphical illustration of OFV 300 does not depict the details of the geographic relationships, which are described within respect to FIG. 2. Although FIG. 3 indicates a neighboring minutia within each octant sector, in some instances, there may be no neighboring minutiae within a particular sector. In such instances, the OFV for the particular sector without a neighboring minutia is set to zero. Otherwise, because the neighboring minutiae 322, 332, 342, 352, 362, 372, 382, and 392 may not overlap with particular minutiae 310, the OFV is greater than zero.

Figure 4:
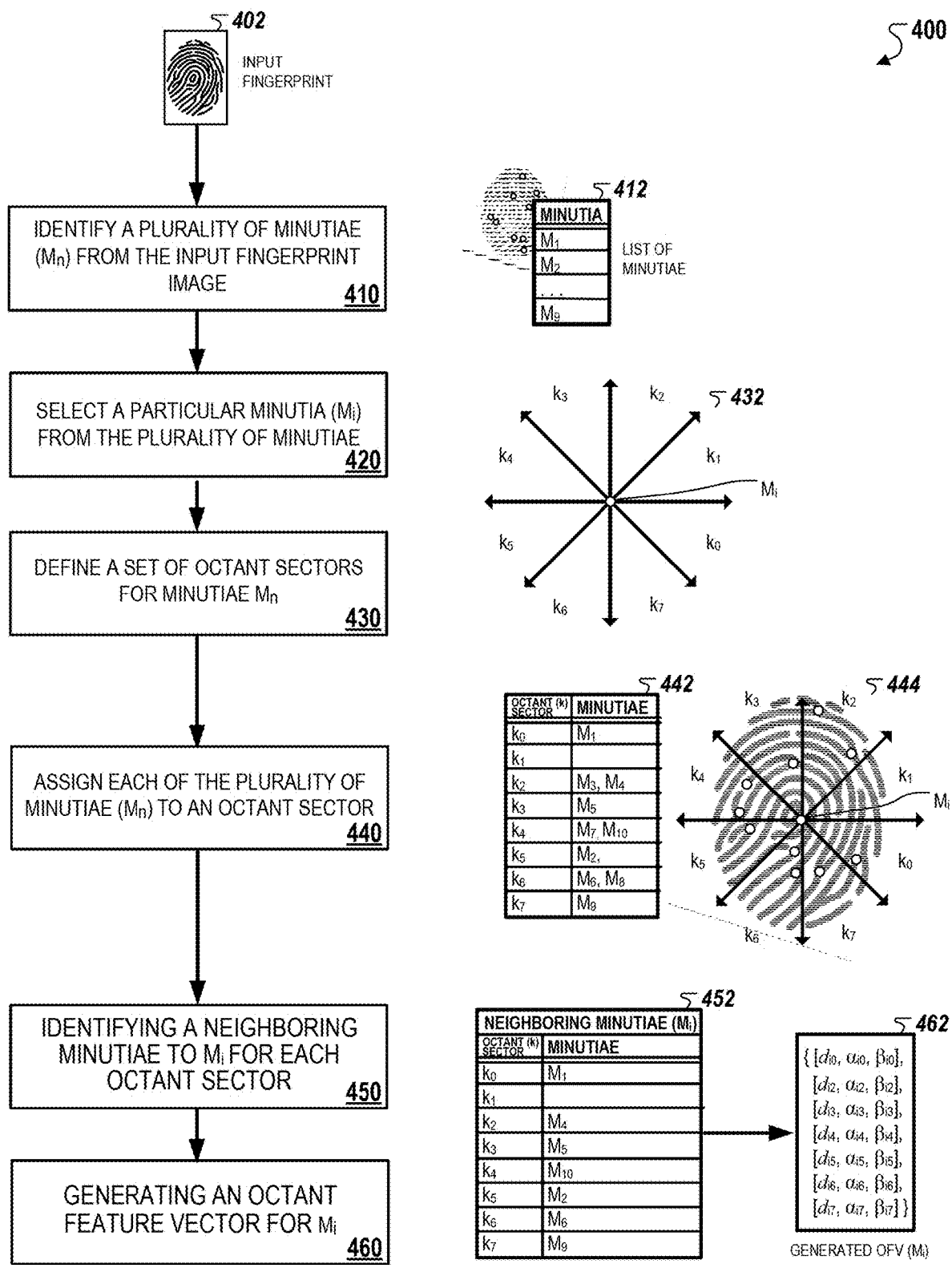
FIG. 4 depicts an exemplary process of generating an octant feature vector (OFV).

FIG. 4 is an exemplary process 400 of generating an octant feature vector (OFV). Briefly, the process 400 may include identifying a plurality of minutiae from the input fingerprint image (410), selecting a particular minutia from the plurality of minutiae (420), defining a set of octant sectors for the plurality of minutiae (430), assigning each of the plurality of minutiae to an octant sector (440), identifying a neighboring minutiae to the particular minutia for each octant sector (450), and generating an octant feature vector for the particular minutia (460).

In more detail, the process 400 may include identifying a plurality of minutiae from the input fingerprint image (410). For instance, the automatic fingerprint identification system 100 may receive the input fingerprint 402 and generate a list of minutiae 412 using the techniques described previously with respect to FIG. 1B.

The process 400 may include selecting a particular minutia from the plurality of minutiae (420). For instance, the automatic fingerprint identification system 100 may select a particular minutiae within the list of minutiae 412.

The process 400 may include defining a set of octant sectors for the plurality of minutiae (430). For instance, the automatic fingerprint identification system 100 may generate a set of octant sectors 432 that include individual octant sectors $k_0$ to $k_7$ as shown in FIG. 4. The set of octant sectors 432 may be generated in reference to the particular minutia that is selected in step 420.

The process 400 may include assigning each of the plurality of minutiae to an octant sector (440). For instance, the automatic fingerprint identification system 100 may assign each of the plurality of minutiae from the list of minutiae 412 into corresponding octant sectors within the set of octant sectors 432. The assigned minutiae may be associated with the corresponding octant sectors in a list 442 that includes the number of minutiae that are identified within each individual octant sector. For example, as shown in FIG. 4, the exemplary octant sector $k_1$ has no identified minutiae, whereas the exemplary $k_6$ includes two identified minutiae within the octant sector. The graphical illustration 444 represents the locations of the plurality of minutiae, relative to the particular selected minutia, $M_i$, within the individual octant sectors.

The process 400 may include identifying a neighboring minutiae to the particular minutia for each octant sector (450). For instance, the automatic fingerprint identification system 100 may identify, from all the neighboring minutiae within each octant sector, the neighboring minutia that is the closest neighboring minutia based on the distance between each neighboring minutia and the particular selected minutia, $M_i$. For example, for the octant sector $k_6$, the automatic fingerprint identification system 100 may determine that the minutia, $M_6$ is the closest neighboring minutia based on the distance between $M_i$ and $M_6$. The closest neighboring minutiae for all of the octant sectors may be aggregated within a list of closest neighboring minutiae 452 that identifies each of the closest neighboring minutiae.

The process 400 may include generating an octant feature vector for the particular minutia (460). For instance, the automatic fingerprint identification system 100 may generate an octant feature vector 462, based on the list of closest neighboring minutiae 452, which includes a set of relative features such as the Euclidean distance 230, the minimum rotation angle 240, and the minimum rotation angle 250 as described previously with respect to FIG. 2.

As described above with respect to FIGS. 2-4, OFVs for minutiae may be used to characterize local relationships with neighboring minutiae, which are invariant to the rotation and translation of the fingerprint that includes the minutiae. The OFVs are also insensitive to distortion, since the nearest neighboring minutiae are assigned to multiple octant sectors in various directions, thereby allowing flexibility of orientation of up to 45°. In this regard, the OFVs of minutiae within a fingerprint may be compared against the OFVs of minutiae within another fingerprint (e.g., a search fingerprint) to determine a potential match between the two fingerprints. Descriptions of the general fingerprint matching process and the OFV matching process are provided below.

Fingerprint Identification and Matching

In general, the automatic fingerprint identification system 100 may perform fingerprint identification and matching in two stages: (1) an enrollment stage, and (2) an identification/verification stage.

In the enrollment stage, an individual (or a "registrant") has their fingerprints and personal information enrolled. The registrant may be an individual manually providing their fingerprints for scanning or, alternately, an individual whose fingerprints were obtained by other means. In some examples, registrants may enroll fingerprints using latent prints, libraries of fingerprints, and any other suitable repositories and sources of fingerprints. As described, the process of "enrolling" and other related terms refer to providing biometric information (e.g., fingerprints) to an identification system (e.g., the automatic fingerprint identification system 100).

The automatic fingerprint identification 100 system may extract features such as minutiae from fingerprints. As described, "features" and related terms refer to characteristics of biometric information (e.g., fingerprints) that may be used in matching, verification, and identification processes. The automatic fingerprint identification system 100 may create a reference record using the personal information and the extracted features, and save the reference record into the database 150 for subsequent fingerprint matching, verification, and identification processes.

In some implementations, the automatic fingerprint identification system 100 may contain millions of reference records. As a result, by enrolling a plurality of registrants (and their associated fingerprints and personal information), the automatic fingerprint identification system 100 may create and store a library of reference records that may be used for comparison to search records. The library may be stored at the database 150 associated.

In the identification stage, the automatic fingerprint identification system 100 may use the extracted features and personal information to generate a record known as a "search record". The search record represents a source fingerprint for which identification is sought. For example, in criminal investigations, a search record may be retrieved from a latent print at a crime scene. The automatic fingerprint identification may compare the search record with the enrolled reference records in the database 150. For example, during a search procedure, a search record may be compared against the reference records stored in the database 150. In such an example, the features of the search record may be compared to the features of each of the plurality of reference records. For instance, minutiae extracted from the search record may be compared to minutiae extracted from each of the plurality of reference records.

As described, a "similarity score" is a measurement of the similarity of between two or more elements (e.g., minutiae) belonging to a search record and a reference record. The similarity score may be represented as a numerical value representative of a degree of similarity. For instance, in some implementations, the values of the similarity score may range from 0.0 to 1.0 or 0 to 100%, where a higher magnitude represents a greater degree of similarity between the search record and the reference record.

The automatic fingerprint identification system 100 may compute individual similarity scores for each comparison of features (e.g., minutiae), and aggregate similarity scores (or "final similarity scores") between the search record to each of the plurality of reference records. In this regard, the automatic fingerprint identification system 100 may generate similarity scores of varying levels of specificity throughout the matching process of the search record and the plurality of reference records.

The automatic fingerprint identification system 100 may also sort each of the individual similarity scores based on the value of the respective similarity scores of individual features. For instance, the automatic identification system 100 may compute individual similarity scores between respective minutiae between the search fingerprint and the reference fingerprint, and sort the individual similarity scores by their respective values.

A higher final similarity score indicates a greater overall similarity between the search record and a reference record while a lower final similarity score indicates a lesser over similarity between the search record and a reference record. Therefore, the match (e.g., the relationship between the search record and a reference record) with the highest final similarity score is the match with the greatest relationship (based on minutiae comparison) between the search record and the reference record.

Minutiae and OFV Matching

Minutiae and corresponding OFV may be determined for fingerprints in a reference record or in a search record. As described above, when identifying a match for a fingerprint, the fingerprint to be matched may be input to the automatic fingerprint identification system 100 as an input fingerprint 104. A search record may then be generated that includes the input fingerprint (also referred to as search fingerprint) and data indicative of any minutiae and OFVs in the search fingerprint.

The data indicative of any minutiae and OFVs in the search fingerprint may be compared to minutiae and OFVs in a reference fingerprint to identify mated minutiae pairs. As part of the comparison, transformation parameters may be estimated by comparing attributes of the corresponding mated minutiae. For example, the transformation parameters may indicate the degree to which the search record has been transformed (e.g., perturbed or twisted) as relative to a particular reference record. In other examples, the transformation parameters may be applied to verify that, for a particular pair of a reference record and a search record (a "potential matched fingerprint pair"), mated minutiae pairs exhibit corresponding degrees of transformation.

In some implementations, the automatic fingerprint identification system 100 may use the OFVs to determine the number of possible corresponding minutiae pairs. For example, the automatic fingerprint identification system 100 may evaluate the similarity between two respective OFVs associated with the search record and the reference record. The automatic fingerprint identification system 100 may identify all possible local matching areas of the compared fingerprints by comparing the OFVs. The automatic fingerprint identification system 100 may also calculate an individual similarity score for each of the mated OFV pairs. The automatic fingerprint identification system 100 may cluster all OFVs of the matched areas with similar transformation effects (e.g., rotation and transposition) into a group.

Based on the amount of similarity between mated minutiae pairs in each potential matched fingerprint pair, and the consistency of the transformation, a similarity score may be computed. An individual similarity score reflects a confidence that a particular minutiae corresponds to a particular search minutiae that is being compared to. The automatic fingerprint identification system 100 may then compute aggregate similarity scores, between a list of particular minutiae and a list of search minutiae, based the values of the individual similarity scores for each minutiae. For instance, as described more particularly below, various types of aggregation techniques may be used to determine the aggregate similarity scores between the reference fingerprint and the search fingerprint. In some implementations, the pair of potential matched fingerprint pairs with the highest similarity score may be determined as a candidate matched fingerprint pair.

Figure 5:
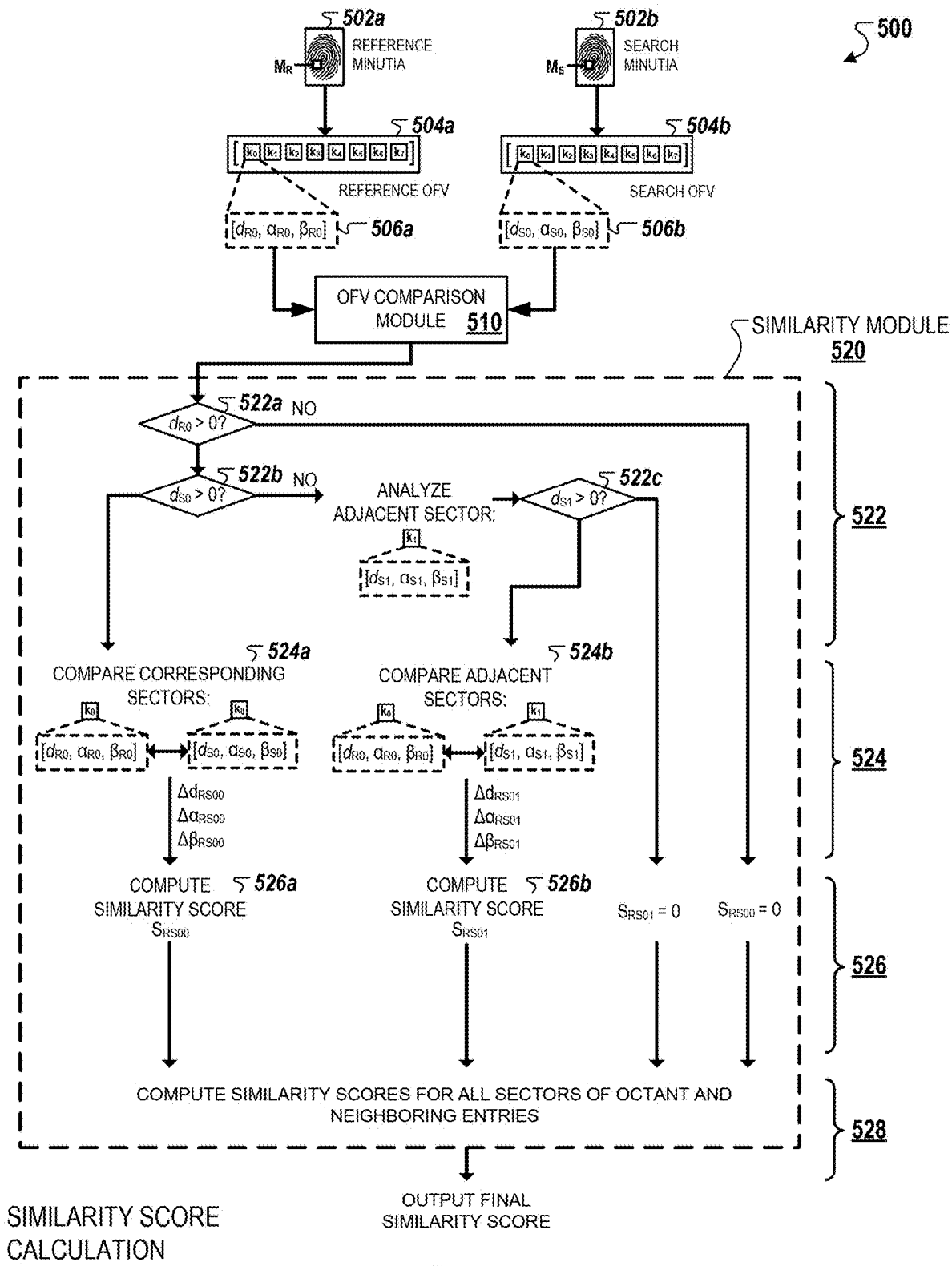
FIG. 5 depicts an exemplary process of calculating similarity between two minutiae.

FIG. 5 illustrates an exemplary process of calculating an individual similarity score between a particular minutia and a search minutia. Referring to FIG. 5, a similarity determination process 500 may be used to compute an individual similarity score between a particular minutia 502a from a reference fingerprint, and a search minutia 502b from a search fingerprint. A reference OFV 504a and a search OFV 504b may be generated for the particular minutia 502a and the search minutia 504b, respectively, using the techniques described with respect to FIG. 4. As shown, the search and reference OFVs 504a and 504b include individual octant sectors $k_0$ to $k_7$ as described as illustrated in FIG. 3. Each of the reference OFV 504a and the search OFV 504b may include parameters such as, for example, the Euclidian distance 230, the minimum rotation angle 240, and the minimum rotation angle 250 as described with respect to FIG. 2. As shown in FIG. 5, exemplary parameters 506a and 506b may represent the parameters for octant sector $k_0$ of the reference OFV 502a and the search OFV 502b, respectively.

The similarity score determination may be performed by an OFV comparison module 520, which may be a software module or component of the automatic fingerprint identification system 100. In general, the similarity score calculation includes four operations. Initially, the Euclidian distance values of a particular octant sector may be evaluated (522). Corresponding sectors between the reference OFV 504a and the similarity OFV 504b may then be compared (524). A similarity score between a particular octant sector within the reference OFV 504a and its corresponding octant sector in the search OFV 504b may then be computed (526). The similarity scores for other octant sectors of the reference OFV 504a and the search OFV 504b may then be computed and combined to generate the final similarity score between the reference OFV 504a and the search OFV 504b (528).

With respect to operation 522, the similarity module 520 may initially determine if the Euclidian distance values within the parameters 506a and 506b are non-zero values. For instance, as shown in decision point 522a, the Euclidean distance associated with the octant sector of the reference OFV 504a, $d_{RO}$, is initially be evaluated. If this value is equal to zero, then the similarity score for the octant sector $k_0$ is set to zero. Alternatively, if the value of $d_{RO}$ is greater than zero, then the similarity module 520 proceeds to decision point 522b, where the Euclidean distance associated with the octant sector of the search OFV 504a, $d_{SO}$, is evaluated. If the value of $d_{SO}$ is not greater than zero, then the OFV similarity module 520 evaluates the value of the Euclidean distance ds1, which is included in an adjacent sector k1 to the octant sector $k_0$ within the reference OFV 504b. Although FIG. 5 represents only one of the adjacent sectors being selected, because each octant sector includes two adjacent octant sectors as shown in FIG. 3, in other implementations, octant sector $k_7$ may also be evaluated. If the value of the Euclidean distance within the adjacent octant sector is not greater than zero, then the similarity module 520 sets the value of individual similarity score $S_{RS01}$, between the octant sector $k_0$ of the reference OFV 504a and the octant sector $k_1$ of the reference OFV 504b, to zero.

Alternatively, if the either the value of Euclidean distance $d_{RO}$ within the octant sector $k_0$ of the reference OFV 504a, or the Euclidean distance ds1 within the adjacent octant sector $k_1$ of the search OFV 504b is determined to be a non-zero value within the decision points 522b and 522c, respectively, then the similarity module proceeds to step 524.

In some instances, a particular octant vector may include zero corresponding minutiae within the search OFV 504b due to localized distortions within the search fingerprint. In such instances, where the corresponding minutiae may have drifted to an adjacent octant sector, the similarity module 520 may alternatively compare the features of the octant vector of the reference OFV 504a to a corresponding adjacent octant vector of the search OFV 504b as shown in step 524b.

If proceeding through decision point 522b, the similarity module 520 may proceed to step 524a where the corresponding octant sectors between the reference OFV 504a and the search OFV 504b are compared. If proceeding through decision point 522c, the similarity module 520 may proceed to step 524b where the octant sector $k_0$ of the reference OFV 504a is compared to the corresponding adjacent octant sector $k_1$ the search OFV 504b. During either process, the similarity module 520 may compute the difference between the parameters that are included within each octant sector of the respective OFVs. For instance, as shown, the difference between the Euclidean distances 230, $\Delta d$, the difference between the minimum rotation angles 240, $\Delta \alpha$, and the difference between the minimum rotation angles 250, $\Delta \beta$, may be computed. Since these parameters represent geometric relationships between pairs of minutiae, the differences between them represent distance and orientation differences between the reference and search minutiae with respect to particular octant sectors.

In some implementations, dynamic threshold values for the computed feature differences may be used to handle nonlinear distortions within the search fingerprint in order to find mated minutiae between the search and reference fingerprint. For instance, the values of the dynamic thresholds may be adjusted to larger or smaller values to adjust the sensitivity of the mated minutiae determination process. For example, if the value of the threshold for the Euclidean distance is set to a higher value, than more minutiae within a particular octant sector may be determined to be a neighboring minutia to a particular minutiae based on the distance being lower than the threshold value. Likewise, if the threshold is set to a lower value, then a smaller number of minutiae within the particular octant sector may be determined to be neighboring minutia based on the distance to the particular minutia being greater than the threshold value.

After either comparing the corresponding octant sectors in step 524a or comparing the corresponding adjacent octant sectors in step 524b, the similarity module 520 may then compute an individual similarity score between the respective octant sectors in steps 526a and 526b, respectively. For instance, the similarity score may be computed based on the values of the feature differences as computed in steps 524a and 524b. For instance, the similarity score may represent the feature differences and indicate minutiae that are likely to be distorted minutiae. For example, if the feature differences between a particular minutiae and corresponding search minutia within a particular octant sector are close the dynamic threshold values, the similarity module 520 may identify the corresponding search minutia as a distortion candidate.

After computing the similarity score for either the corresponding octant sectors, or the corresponding adjacent sectors in steps 526a and 526b, respectively, the similarity module 520 may repeat the steps 522-526 for all of the other octant sectors included within the reference OFV 504a and the search OFV 504b. For instance, the similarity module 520 may iteratively execute the steps 522-526 until the similarity scores between each corresponding octant sector and each corresponding adjacent octant sector are computed for the reference OFV 504a and the search OFV 504b.

The similarity module may then combine the respective similarity scores for each corresponding octant sectors and/or the corresponding adjacent octant sectors to generate a final similarity score between the particular minutia and the corresponding search minutia. This final similarity score is also referred to as the "individual similarity score" between corresponding minutiae within the search and reference fingerprints as described in other sections of this specification. The individual similarity score indicates a strength of the local matching of the corresponding OFV.

In some implementations, the particular aggregation technique used by the similarity module 522 to generate the final similarity score (or the "individual similarity score") may vary. For example, in some instances, the final similarity score may be computed based on adding the values of the similarity scores for the corresponding octant sectors and the corresponding adjacent octant sectors, and normalizing the sum by a sum of a total number of possible mated minutiae for the particular minutia and a total of number of possible mated minutiae for the search minutia. In this regard, the final similarity score is weighted by considering the number of mated minutiae and the total number of possible mated minutiae.

As described above, FIG. 5 illustrates a method utilized by the automatic fingerprint identification system to process, analyze, and match individual minutiae from a search fingerprint to a reference fingerprint. As described further below, this method may be utilized within a matching operation for a distorted fingerprint to compute a final similarity score that indicates a confidence of a fingerprint match between a search fingerprint and a reference fingerprint.

Distorted Fingerprint Matching

Figure 6A:
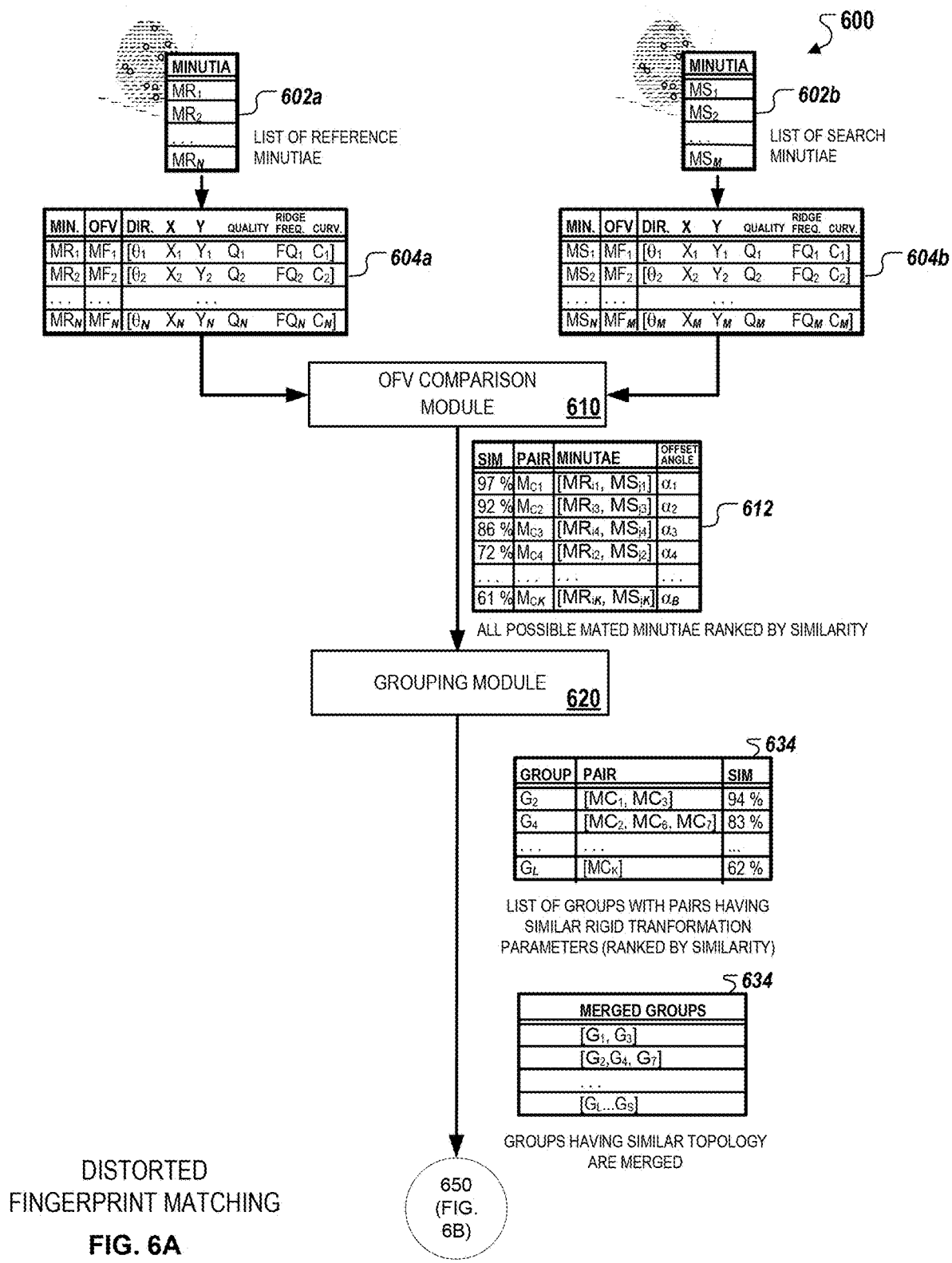
FIGS. 6A and 6B depict an exemplary process for matching distorted fingerprints.
Figure 6B:
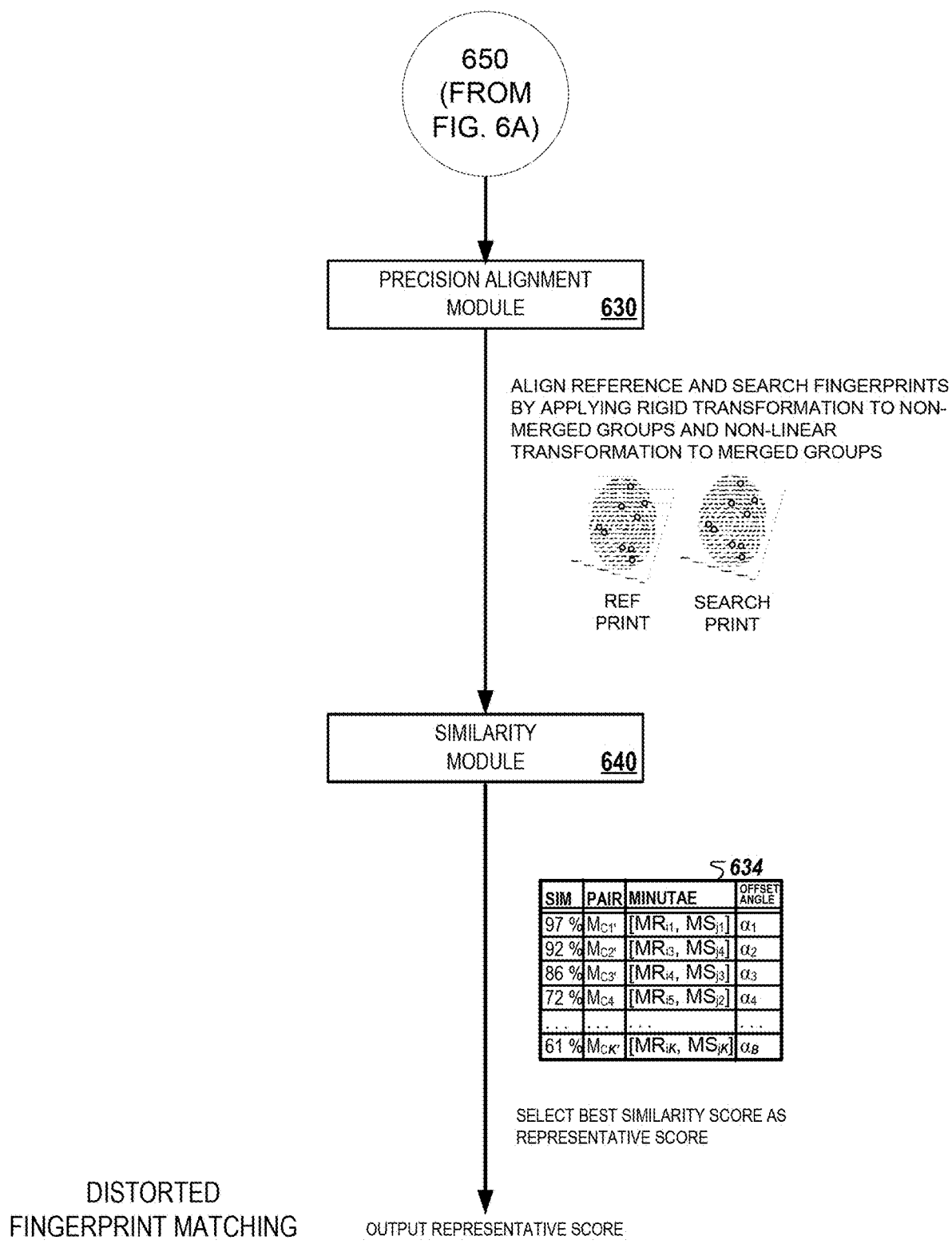

FIGS. 6A and 6B illustrate an exemplary distorted fingerprint matching operation 600. The fingerprint matching operation 600 may be used to match a search fingerprint that may be nonlinearly distorted or may exhibit other types of errors that would likely cause inaccurate results using other fingerprint matching technologies. The fingerprint matching operation 600 employs the principles and techniques described previously in FIGS. 1-5 to reduce errors resulting from distortion.

The fingerprint matching operation 600 may include generating a list of invariant and distortion-tolerant reference OFVs 602a for a list of particular minutiae 602a, and a list of invariant and distortion-toleration search OFVs 604b for a list of search minutiae 602a. For instance, as described in FIG. 4, the list of reference OFVs 604a and the list of search OFVs 604b may be generated by comparing each minutia of the list of search minutiae 602a and the list of reference 602b to its neighboring minutiae within a set of octant sectors.

An OFV comparison module may compare the respective search and reference OFVs 604a and 604b, respectively, and generate a list of all possible mated minutiae 612. The list of all possible mated minutiae may include individual pairs of search minutiae and corresponding reference minutiae based on comparing the features included within the respective reference OFVs included in the list of reference OFVs 604a and the respective search OFVs included in the list of search OFVs 604b. The list of all possible mated minutiae 812 may be ranked by similarity such that mated minutiae having a higher similarity are ranked higher.

In some implementations, the list of reference OFVs 604a and the list of search OFVs 604b may include a set of absolute features that improve fingerprint matching for distorted fingerprint matching. For instance, the absolute features may include a direction, x-y coordinates, a quality score, a ridge frequency, and a curvature. In some implementations, one or more of the absolute features are included into the calculation of individual similarity scores, as described in FIG. 5, as weights to factor in impacts of distortions on the search fingerprint.

Next, a Grouping Module 620 of the automatic fingerprint identification system 100 may group the listed possible minutiae pairs in different groups using a pose grouping technique (622). In the pose grouping technique, rigid transformation parameters $(\Delta y_i, \Delta x_i, \Delta \theta_i)$ are determined for each possible mated minutiae pair using Equations 1-3 noted below.

$$\Delta x_i = x_i^T - x_i^I \quad \text{[Equation 1]}$$

$$\Delta y_i = y_i^T - y_i^I \quad \text{[Equation 2]}$$

$$\Delta \theta_i = \theta_i^T - \theta_i^I \quad \text{[Equation 3]}$$

For other mated pairs in which $j \neq i$, the rigid transformation parameters $(\Delta y_j, \Delta x_j, \Delta \theta_j)$ are determined using Equations 4a-4c noted below.

$$\begin{cases} |\Delta x_i - \Delta x_j| < T_1 & \text{[Equation 4a]} \\ |\Delta y_i - \Delta y_j| < T_2 & \text{[Equation 4b]} \\ \min(|\Delta \theta_i - \Delta \theta_j|, 180 - |\Delta \theta_i - \Delta \theta_j|) < T_3 & \text{[Equation 4c]} \end{cases}$$

$T_1$, $T_2$ and $T_3$ are thresholds that may be set by an administrator of the automatic fingerprint identification system 100. Two rigid transformation parameter sets are considered close to each other if they satisfy the constraints set forth by Equations 4a-4c. Mated pairs j may be removed from the list of possible minutiae pairs if their rigid transformation parameters satisfy the constraints of Equations 4a-4c.

The Grouping Module 620 may repeat the calculation of the rigid transformation parameters using Equations 1-4c for all i and j mated pairs. Based on the similarity between the calculated rigid transformation parameters, the minutiae pairs may be divided into two groups. Thus, two pairs of possible mated minutiae may be grouped into a single group if the rigid transformation parameters of the two pairs are within a threshold range of similarity to each other. Each group of possible mated minutiae contains a set of possible mated minutiae pairs that are subject to similar rigid transformation.

After completing the pose grouping, the rigid geometric constraints are used to find a set of geometrically consistent pairs for each group. In particular, for each group of possible mated minutiae pairs, the two best minutiae pairs may be selected as a reference pair and more mated pairs may be identified from the complete list using the rigid geometric constraints as described above. A similarity score between all the minutiae pairs in a group may then be determined and averaged. The scored groups may be sorted based on their respective average similarity scores 624. For example, groups having a higher average similarity score may be ranked higher.

Figure 7:
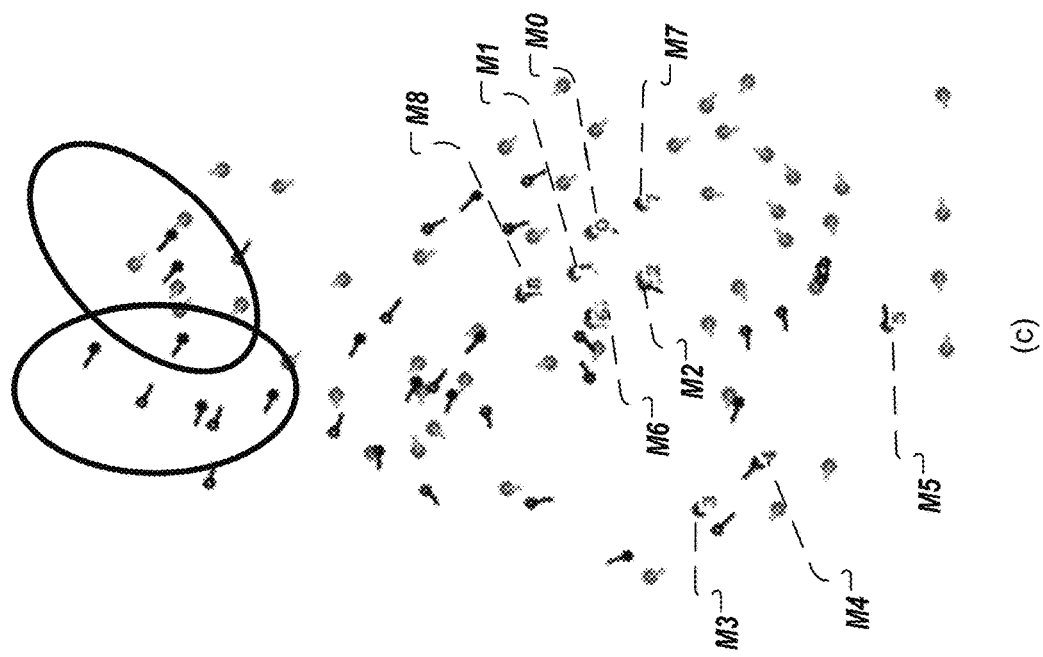
FIG. 7 depicts exemplary reference and search fingerprints with mated minutiae.
Figure 7:
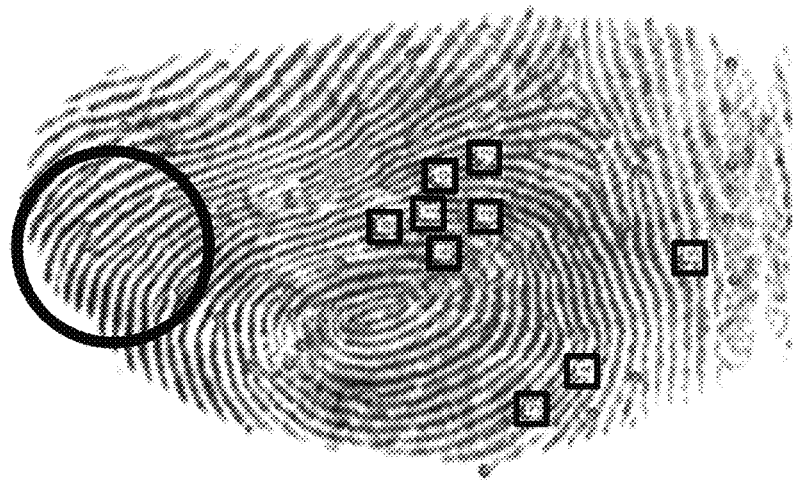
Figure 7:
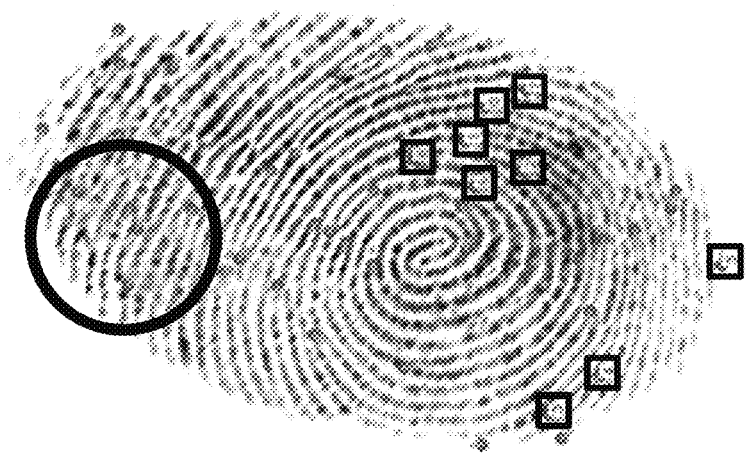
Figure 8:
FIG. 8 depicts exemplary reference and search fingerprints with mated minutiae.

An example of dividing minutiae pairs into two groups for reference and search fingerprints is shown in FIGS. 7 and 8. FIG. 7 depicts an example of a group ("Group A") in which a reference fingerprint (image (b)) and a search fingerprint (image (a)) have nine mated minutiae M0-M8 in a group. Mated minutiae pairs have been marked up in square boxes for emphasis and illustrative purposes. Image (c) in FIG. 7 depicts the transformed search minutiae superimposed on the reference minutiae. The rigid transformation $(\Delta x, \Delta y, \Delta \theta)$ is (42, 9, 10). The ovals in images (a) and (b) correspond to ovals in image (c). As can be seen in FIG. 7, the mated minutiae M0-M8 only cover a portion of the fingerprint. Accordingly, even if non-linear transformation parameters are estimated from mated minutiae pairs M0-M8, the non-linear transformation may result in an accurate transformation only in the area close to the mated minutiae pairs M0-M8.

The top part of the fingerprints corresponding to the areas marked by ovals may still be relatively displaced after a non-linear transformation that relies on mated minutiae pairs M0-M8.

FIG. 8 depicts an example of a grouping ("Group B") of five mated minutiae pairs between the reference fingerprint (image (b)) and a search fingerprint (image (a)). Mated minutiae pairs have been marked up in square boxes for emphasis and illustrative purposes. The rigid transformation $(\Delta x, \Delta y, \Delta \theta)$ of the group of mated minutiae is (59, 32, −22). The mated minutiae pairs of Group B may have a similar issue as the mated minutiae pairs of Group A in that the pairs are only located in a particular region of the fingerprint and non-linear transformation may result in an accurate transformation only in the area close to the mated minutiae pairs.

As described above, the two best minutiae pairs of Groups A and B, respectively, may be selected as a reference pair and more mated pairs may be identified from the complete list using the rigid geometric constraints. A similarity score between all the minutiae pairs in Groups A and B may be determined and averaged. Groups A and B may then be ranked according to their respective average similarity score.

Next, the grouping module 620 may combine two groups if the topology of the two groups is similar. For example, the grouping module 620 may go through the list of available groups and compare the topology of two groups in the list. If the similarity in topology of the two groups satisfies topological constraints, the two groups may be combined to form one larger group 626. In some implementations, the grouping module 630 may begin at the top of the list of groups ranked by similarity and go down the list of groups to identify pairs of groups that have similar topologies and can be combined to form a larger group.

Figure 9:
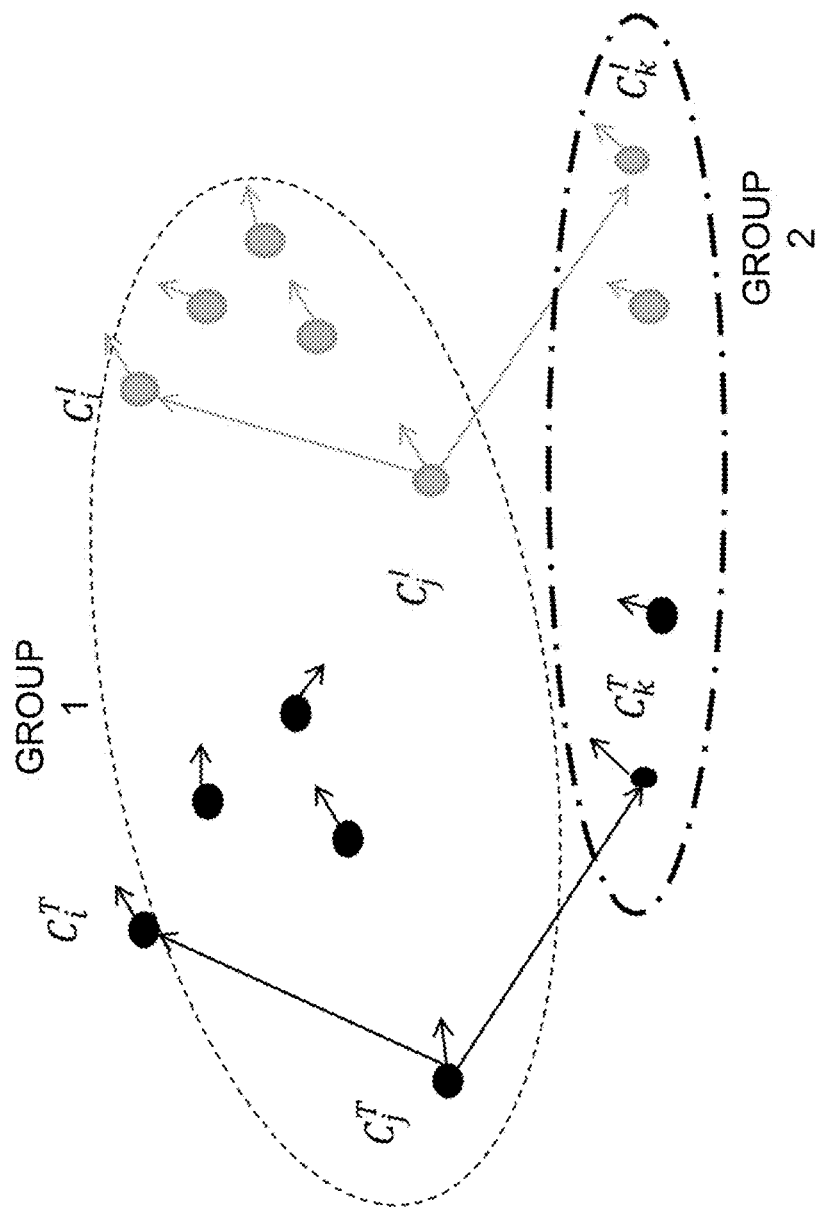
FIG. 9 depicts two groups of mated minutiae.

FIG. 9 depicts an example in which portions of two groups may be combined. In FIG. 9, minutiae belonging to Group 1 are included in the larger oval. Minutiae belonging to Group 2 are included in the smaller oval. Minutiae belonging to a reference footprint are depicted in solid black circles. Minutiae belonging to a search footprint are depicted in solid grey circles. Groups 1 and 2, respectively, include mated minutiae pairs comprising minutiae from the reference footprint and minutiae from the search footprint. As an example, $C_i^T \leftrightarrow C_i^I$ and $C_j^T \leftrightarrow C_j^I$ are mated minutiae pairs in Group 1, and $C_k^T \leftrightarrow C_k^I$ is a mated minutiae pair in Group 2.

The minutiae pair $C_k^T \leftrightarrow C_k^I$ may be joined to Group 1 if topological constraints are satisfied. The topological constraint used is the cross product between two vectors $C_i^T - C_j^T$ and $C_k^T - C_j^T$, and two vectors $C_i^I - C_j^I$ and $C_k^I - C_j^I$. If the cross product points to the same direction or within a threshold range of the same direction, it is topologically consistent. The same procedure is repeated for every pair in Group 1. If all of the constraints are satisfied, the minutiae pair $C_k^T \leftrightarrow C_k^I$ is added to group 1. Merged groups may be distinguished though any suitable identification means such as, for example, a tag or metadata indicating that a group is a merged one.

After processing all the groups and combining groups that can be combined if the constraints noted above are satisfied 630, an Alignment Module 640 of the automatic fingerprint identification system 100 may examine each group and determine whether the group is a merged group or a non-merged group. The matched minutiae in the merged group are used to estimate parameters of a non-linear transformation model. The non-linear transformation may be used to align the reference fingerprint with the search fingerprint.

Since mated minutiae pairs in a merged group are not geometrically consistent with each other with respect to the rigid transformation, non-linear transformation may be used for better alignment. Non-linear transformation parameters for mated minutiae pairs may be determined using various suitable techniques, including, for example, a Thin-plate spline (TPS) model. Accordingly, in some implementations, (TPS) parameters may be estimated from the matched minutiae pairs in the merged match groups, and TPS transformation may be applied to search fingerprint minutiae so that the minutiae in the search fingerprint are better aligned with the minutiae in the reference fingerprint. The TPS parameters, or more generally, the non-linear transformation parameters, are applied to each of the search minutiae of search print, not just the search minutiae in the merged group of search print.

Figure 10:
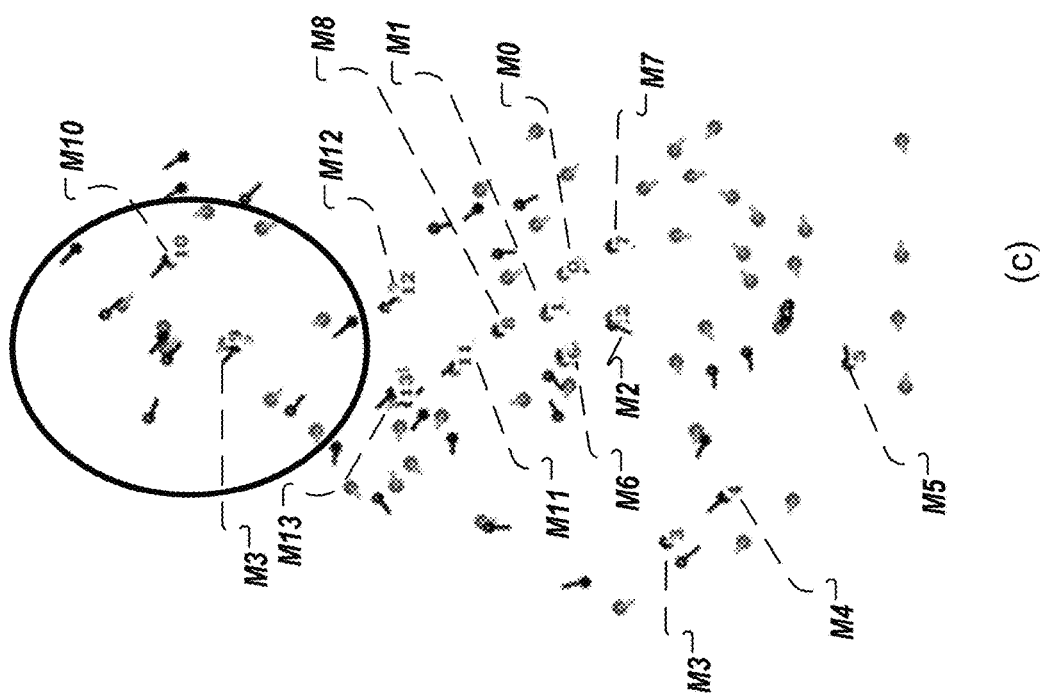
FIG. 10 depicts exemplary reference and search fingerprints with mated minutiae after non-linear and robust transformations.
Figure 10:
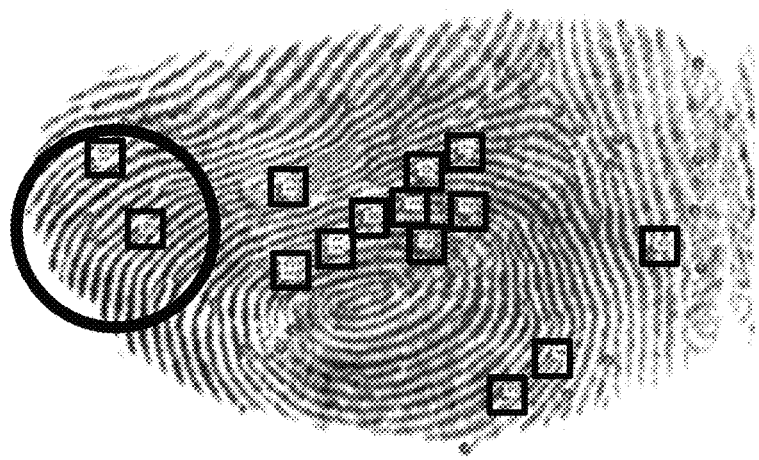
Figure 10:
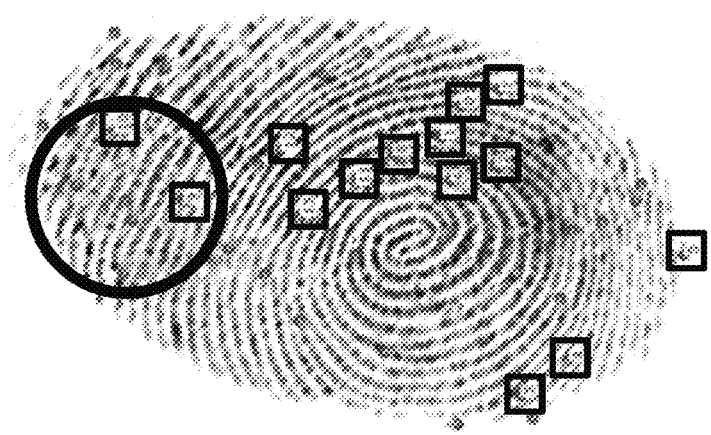

FIG. 10 illustrates an example of the alignment of a reference fingerprint and a search fingerprint after applying non-linear transformation parameters determined using the TPS method. Mated minutiae pairs have been marked up in square boxes for emphasis and illustrative purposes. Image (c) in FIG. 10 depicts the transformed search minutiae superimposed on the reference minutiae. The ovals in images (a) and (b) correspond to the oval in image (c)

In FIG. 10, groups A and B, as respectively shown in FIGS. 7 and 8, have been merged resulting in a combined group of 14 mated minutiae M0-M13. By combining two groups and performing non-linear transformation on the search minutiae, the alignment and matching between the search fingerprint and reference fingerprint is significantly improved over the alignment and matching of mated minutiae pairs shown in FIGS. 7 and 8.

After performing the non-linear transformation on the minutiae of the search fingerprint, a similarity module 650 may again conduct a similarity analysis of all the minutiae (mated and non-mated) for the reference and search fingerprints 654. In some implementations, the similarity levels are determined for matched and non-matched minutiae in an overlapping area of the search minutiae and the reference minutiae.

As described above with reference to FIG. 5, an individual similarity score may be computed based on aggregating single similarity scores between individual octant sectors of the respective OFVs of the search and particular minutia within mated and non-mated minutiae pairs. The similarity score calculation may additionally include weights based on the absolute features included within the respective OFVs for the search and reference minutiae. The list of individual similarity scores for all minutiae may then be aggregated to compute a final similarity score between the reference fingerprint and the search fingerprint. In some implementations, the final similarity score is determined based on selecting the maximum value of the similarity score among all topologically consistent group pairs. For instance, the final similarity score may be the best similarity level among the merged groups.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and may even be claimed as such, one or more features from a claimed combination may in some cases, be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. Moreover, the separation of various system components in the embodiments described above should not be understood as requiring such separation in all embodiments, and it should be understood that the described program components and systems may generally be integrated together in a single software product or packaged into multiple software products.

It should be understood that the phrase one or more of and the phrase at least one of include any combination of elements. For example, the phrase one or more of A and B includes A, B, or both A and B. Similarly, the phrase at least one of A and B includes A, B, or both A and B.

Thus, particular implementations have been described. Other implementations are within the scope of the following claims. For example, the actions recited in the claims may be performed in a different order and still achieve desirable results.

What is claimed is:

1. A computer-implemented method comprising:
   obtaining search minutiae of a search fingerprint and reference minutiae;
   determining minutiae pairs, each minutiae pair comprising a search minutia of the search minutiae and a reference minutia of the reference minutiae that have a similarity level that satisfies a similarity threshold;
   determining groups of minutiae pairs based on a transformation parameter and topology, the groups comprising a group of merged groups of minutiae pairs and an unmerged group of minutiae pairs; and
   performing a first transformation on the merged group of minutiae pairs and a second transformation on the unmerged group of minutiae pairs.

2. The computer-implemented method of claim 1, wherein determining the groups of minutiae pairs based on the transformation parameter and topology comprises:
   determining a rigid transformation parameter for each minutiae pair;
   determining that a first rigid transformation parameter for a first minutiae pair is within a rigid transformation similarity threshold of a second rigid transformation parameter for a second minutiae pair; and
   grouping the first minutiae pair and the second minutiae pair in one group based on the first rigid transformation parameter and the second rigid transformation parameter satisfying the rigid transformation similarity threshold.

3. The computer-implemented method of claim 2, wherein determining the groups of minutiae pairs based on the transformation parameter and topology further comprises:
   determining a first topology associated with a first group of minutiae pairs;
   determining a second topology associated with a second group of minutiae pairs;
   determining that a difference between the first topology and the second topology satisfies a topology difference threshold; and
   merging the first group of minutiae pairs and the second group of minutiae pairs based on the difference between the first topology and the second topology satisfying the topology difference threshold.

4. The computer-implemented method of claim 2, wherein determining the groups of minutiae pairs based on the transformation parameter and topology further comprises:
   determining a first topology associated with a first group of minutiae pairs;
   determining a second topology associated with a second group of minutiae pairs;
   determining that a difference between the first topology and the second topology does not satisfy a topology difference threshold; and
   determining not to merge the first group of minutiae pairs and the second group of minutiae pairs based on the difference between the first topology and the second topology not satisfying the topology difference threshold.

5. The computer-implemented method of claim 1, wherein performing the first transformation on the merged group of minutiae pairs and the second transformation on the unmerged group of minutiae pairs comprises:

performing a non-linear transformation on the merged group of minutiae pairs; and performing a rigid transformation on the unmerged group of minutiae pairs.

6. The computer-implemented method of claim 5, wherein:

the reference minutiae is obtained from a reference fingerprint; and by performing the non-linear transformation and the rigid transformation, the reference fingerprint is aligned with the search fingerprint.

7. The computer-implemented method of claim 1, wherein performing the first transformation and the second transformation comprises:

for each group, determining whether the group is a merged group or an unmerged group;

in response to determining that the group is a merged group:

determining parameters of a non-linear transformation model from the minutiae pairs in the group; and performing non-linear transformation on the merged group using the parameters of the non-linear transformation model.

8. The computer-implemented method of claim 1, wherein determining the minutiae pairs comprises:

determining a search octant feature vector for the search minutia of the search minutiae and a reference octant feature vector for the reference minutia of the reference minutiae;

comparing the search octant feature vector with the reference octant feature vector;

determining that a similarity between the search octant feature vector and the reference octant feature vector satisfies the similarity threshold; and determining that the search minutia and the reference minutia are a minutiae pair.

9. The computer-implemented method of claim 1, comprising:

ranking the minutiae pairs based on the similarity level of the search minutia and the reference minutia of each minutiae pair.

10. A system comprising:

one or more processors and one or more storage devices storing instructions that are operable and when executed by the one or more processors, cause the one or more processors to perform operations comprising:

obtaining search minutiae of a search fingerprint and reference minutiae;

determining minutiae pairs, each minutiae pair comprising a search minutia of the search minutiae and a reference minutia of the reference minutiae that have a similarity level that satisfies a similarity threshold;

determining groups of minutiae pairs based on a transformation parameter and topology, the groups comprising a group of merged groups of minutiae pairs and an unmerged group of minutiae pairs; and performing a first transformation on the merged group of minutiae pairs and a second transformation on the unmerged group of minutiae pairs.

11. The system of claim 10, wherein determining the groups of minutiae pairs based on the transformation parameter and topology comprises:

determining a rigid transformation parameter for each minutiae pair;

determining that a first rigid transformation parameter for a first minutiae pair is within a rigid transformation similarity threshold of a second rigid transformation parameter for a second minutiae pair; and grouping the first minutiae pair and the second minutiae pair in one group based on the first rigid transformation parameter and the second rigid transformation parameter satisfying the rigid transformation similarity threshold.

12. The system of claim 11, wherein determining the groups of minutiae pairs based on the transformation parameter and topology further comprises:

determining a first topology associated with a first group of minutiae pairs;

determining a second topology associated with a second group of minutiae pairs;

determining that a difference between the first topology and the second topology satisfies a topology difference threshold; and merging the first group of minutiae pairs and the second group of minutiae pairs based on the difference between the first topology and the second topology satisfying the topology difference threshold.

13. The system of claim 11, wherein determining the groups of minutiae pairs based on the transformation parameter and topology further comprises:

determining a first topology associated with a first group of minutiae pairs;

determining a second topology associated with a second group of minutiae pairs;

determining that a difference between the first topology and the second topology does not satisfy a topology difference threshold; and determining not to merge the first group of minutiae pairs and the second group of minutiae pairs based on the difference between the first topology and the second topology not satisfying the topology difference threshold.

14. The system of claim 10, wherein performing the first transformation on the merged group of minutiae pairs and the second transformation on the unmerged group of minutiae pairs comprises:

performing a non-linear transformation on the merged group of minutiae pairs; and performing a rigid transformation on the unmerged group of minutiae pairs.

15. The system of claim 10, wherein performing the first transformation and the second transformation comprises:

for each group, determining whether the group is a merged group or an unmerged group;

in response to determining that the group is a merged group:

determining parameters of a non-linear transformation model from the minutiae pairs in the group; and performing non-linear transformation on the merged group using the parameters of the non-linear transformation model.

16. One or more non-transitory computer-readable storage media comprising instructions, which, when executed by one or more processors, cause the one or more processors to perform operations comprising:

obtaining search minutiae of a search fingerprint and reference minutiae;

determining minutiae pairs, each minutiae pair comprising a search minutia of the search minutiae and a reference minutia of the reference minutiae that have a similarity level that satisfies a similarity threshold;

determining groups of minutiae pairs based on a transformation parameter and topology, the groups comprising a group of merged groups of minutiae pairs and an unmerged group of minutiae pairs; and performing a first transformation on the merged group of minutiae pairs and a second transformation on the unmerged group of minutiae pairs.

17. The one or more non-transitory computer-readable storage media of claim 16, wherein determining the groups of minutiae pairs based on the transformation parameter and topology comprises:

determining a rigid transformation parameter for each minutiae pair;

determining that a first rigid transformation parameter for a first minutiae pair is within a rigid transformation similarity threshold of a second rigid transformation parameter for a second minutiae pair; and grouping the first minutiae pair and the second minutiae pair in one group based on the first rigid transformation parameter and the second rigid transformation parameter satisfying the rigid transformation similarity threshold.

18. The one or more non-transitory computer-readable storage media of claim 17, wherein determining the groups of minutiae pairs based on the transformation parameter and topology further comprises:

determining a first topology associated with a first group of minutiae pairs;

determining a second topology associated with a second group of minutiae pairs;

determining that a difference between the first topology and the second topology satisfies a topology difference threshold; and merging the first group of minutiae pairs and the second group of minutiae pairs based on the difference between the first topology and the second topology satisfying the topology difference threshold.

19. The one or more non-transitory computer-readable storage media of claim 17, wherein determining the groups of minutiae pairs based on the transformation parameter and topology further comprises:

determining a first topology associated with a first group of minutiae pairs;

determining a second topology associated with a second group of minutiae pairs;

determining that a difference between the first topology and the second topology does not satisfy a topology difference threshold; and determining not to merge the first group of minutiae pairs and the second group of minutiae pairs based on the difference between the first topology and the second topology not satisfying the topology difference threshold.

20. The one or more non-transitory computer-readable storage media of claim 16, wherein performing the first transformation on the merged group of minutiae pairs and the second transformation on the unmerged group of minutiae pairs comprises:

performing a non-linear transformation on the merged group of minutiae pairs; and performing a rigid transformation on the unmerged group of minutiae pairs.

\* \* \* \* \*